US007706549B2

(12) United States Patent
Zhang et al.

(10) Patent No.: US 7,706,549 B2
(45) **Date of Patent: *Apr. 27, 2010**

(54) BROADSIDE SMALL ARRAY MICROPHONE BEAMFORMING APPARATUS

(75) Inventors: Ming Zhang, Cupertino, CA (US); Wan-Chieh Pai, San Jose, CA (US)

(73) Assignee: Fortemedia, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/748,515

(22) Filed: May 15, 2007

(65) Prior Publication Data

US 2008/0069372 A1 Mar. 20, 2008

Related U.S. Application Data

(60) Provisional application No. 60/825,587, filed on Sep. 14, 2006.

(51) Int. Cl.

| | |
|---|---|
| ***H04R 3/00*** | (2006.01) |
| ***H04R 1/02*** | (2006.01) |
| ***H04B 15/00*** | (2006.01) |
| ***H04M 1/00*** | (2006.01) |
| ***H04M 9/08*** | (2006.01) |
| ***G10L 15/00*** | (2006.01) |

(52) U.S. Cl. .......................... 381/92; 381/91; 381/111; 381/122; 381/95; 381/96; 381/94.1; 381/94.3; 379/406.03; 379/406.05; 379/388.01; 379/388.02; 704/231; 704/233

(58) Field of Classification Search .................. 381/92, 381/91, 111, 122.95, 96, 94.1–94.9; 379/406.03, 379/406.05, 388.01–388.02; 704/231, 233
See application file for complete search history.

(56) References Cited

U.S. PATENT DOCUMENTS

| | | | | |
|---|---|---|---|---|
| 5,574,824 | A * | 11/1996 | Slyh et al. | 704/226 |
| 6,449,593 | B1 * | 9/2002 | Valve | 704/233 |
| 6,751,325 | B1 * | 6/2004 | Fischer | 381/313 |
| 6,937,980 | B2 * | 8/2005 | Krasny et al. | 704/231 |
| 2008/0170715 | A1 * | 7/2008 | Zhang et al. | 381/92 |
| 2008/0170716 | A1 * | 7/2008 | Zhang | 381/92 |

OTHER PUBLICATIONS

International Search Report and Written Opinion, dated Sep. 23, 2008.

* cited by examiner

*Primary Examiner*—Devona E Faulk
(74) *Attorney, Agent, or Firm*—Thomas, Kayden, Horstemeyer & Risley

(57) ABSTRACT

A broadside small array microphone beamforming apparatus comprises first and second omni-directional microphones, a microphone calibration unit, and a directional microphone forming unit. The first and second omni-directional microphones respectively convert voice from a desired near-end talker into first and second signals. The second and first omni-directional microphones and the desired near-end talker are respectively arranged at three points of a triangle. The microphone calibration unit receives the first and second signals and correspondingly outputs first and second calibration signals. The directional microphone forming unit receives the first and second calibration signals to generate a first directional microphone signal with a bidirectional polar pattern. The adaptive channel decoupling unit receives the first calibration signal and the first directional microphone signal to generate a first main channel signal and a first reference channel signal for noise detection.

22 Claims, 11 Drawing Sheets

BROADSIDE SMALL ARRAY MICROPHONE BEAMFORMING APPARATUS

BACKGROUND OF THE INVENTION

1. Field of the Invention

The invention relates to small array microphone beamforming, and in particular to a broadside small array microphone beamforming apparatus with a narrow beam facing a near-end talker.

2. Description of the Related Art

Many communication system and voice recognition devices are designed for use in noisy environments. Examples of such applications include communication and/or voice recognition in cars or mobile environments (e.g., on street). For these applications, the microphones in the system pick up not only the desired voice but also noise as well. The noise can degrade the quality of voice communication and speech recognition performance if it is not dealt with in an effective manner.

Noise suppression is often required in many communication systems and voice recognition devices to suppress noise to improve communication quality and voice recognition performance. Noise suppression may be achieved using various techniques, which may be classified as single microphone techniques and array microphone techniques.

Thus, effective suppression of noise in communication system and voice recognition devices is desirable.

BRIEF SUMMARY OF THE INVENTION

A detailed description is given in the following embodiments with reference to the accompanying drawings.

An embodiment of a broadside small array microphone beamforming apparatus is provided. A broadside small array microphone beamforming apparatus comprises first and second omni-directional microphones, a microphone calibration unit, and a directional microphone forming unit. The first and second omni-directional microphones respectively convert voice from a desired near-end talker into first and second signals. The second and first omni-directional microphones and the desired near-end talker are respectively arranged at three points of a triangle. The microphone calibration unit receives the first and second signals and correspondingly outputs first and second calibration signals. The directional microphone forming unit receives the first and second calibration signals to generate a first directional microphone signal with a bidirectional polar pattern. The adaptive channel decoupling unit receives the first calibration signal and the first directional microphone signal to generate a first main channel signal and a first reference channel signal for noise detection.

Another embodiment of a broadside small array microphone beamforming apparatus is provided. A broadside small array microphone beamforming apparatus comprises first and second omni-directional microphones, a microphone calibration unit, and a directional microphone forming unit. The first and second omni-directional microphones respectively convert voice from a desired near-end talker into first and second signals. The second and first omni-directional microphones and the desired near-end talker are respectively arranged at three points of a triangle. The microphone calibration unit receives the first and second signals and correspondingly outputs first and second calibration signals. The directional microphone forming unit receives the first and second calibration signals to generate a first directional microphone signal with one side lobe polar pattern and a second directional microphone signal with another side lobe polar pattern. The adaptive channel decoupling unit receives the first calibration signal, the first directional microphone signal and the second directional microphone signal to generate a first main channel signal and a first reference channel signal for noise detection.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
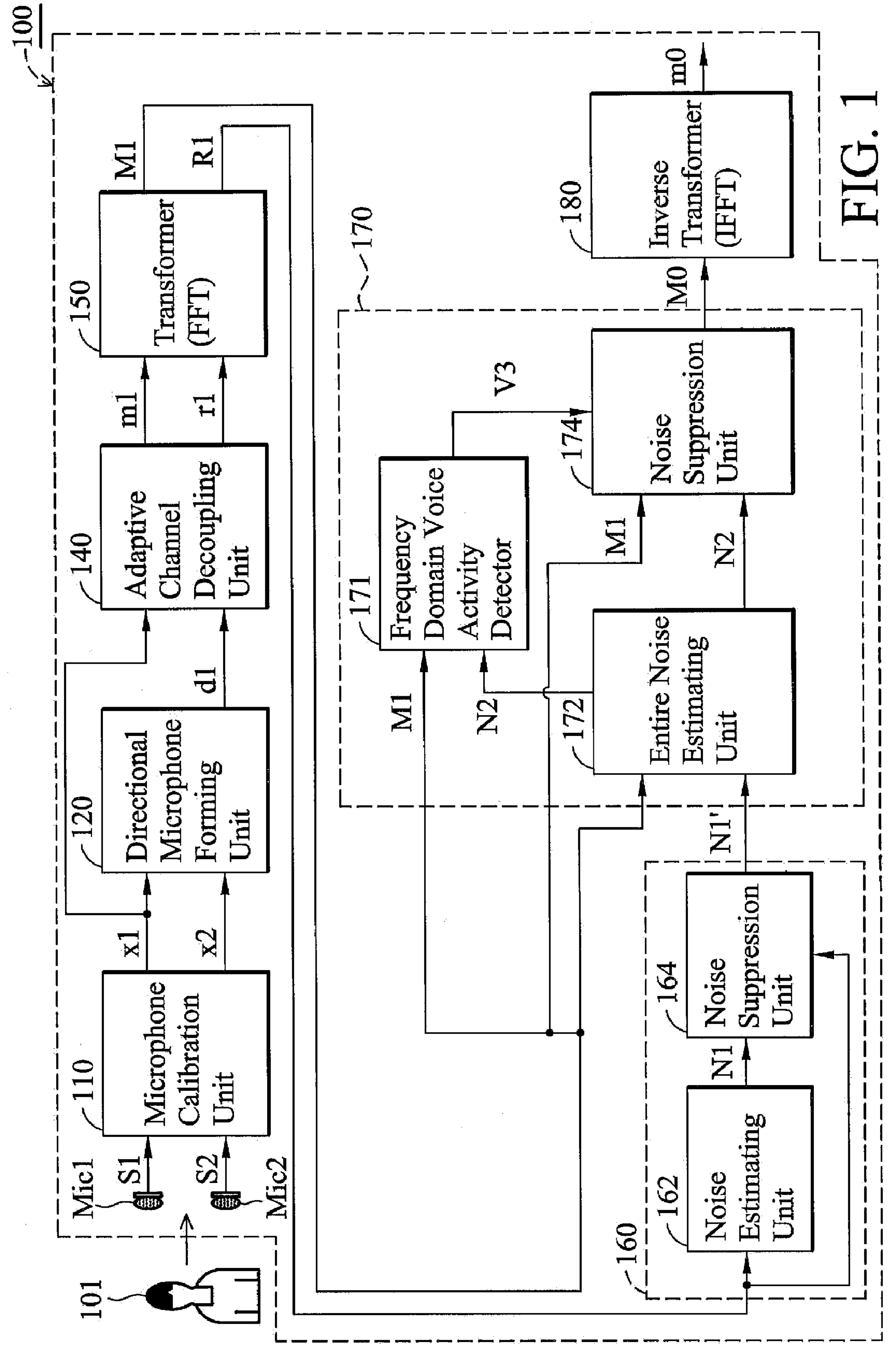
FIG. 1 is a schematic diagram of a broadside small array microphone beamforming apparatus according to an embodiment of the invention.

FIG. 1 is a schematic diagram of broadside small array microphone beamforming apparatus 100 according to an embodiment of the invention. Broadside small array microphone beamforming apparatus 100 comprises omni-directional microphones Mic1 and Mic2, microphone calibration unit 110, directional microphone forming unit 120, adaptive channel decoupling unit 140, transformer 150, noise suppression units 160 and 170 and inverse transformer 180. Omni-directional microphones Mic1 and Mic2 respectively convert voice from desired near-end talker 101 into first and second signals S1 and S2. Second and first omni-directional microphones Mic1 and Mic2 and desired near-end talker 101 are respectively arranged at three points of a triangle, referred to as a broadside way, as shown in FIG. 1. Microphone calibration unit 110 receives first and second signals S1 and S2 and correspondingly outputs first and second calibration signals X1 and X2. Directional microphone forming unit 120 receives first and second calibration signals X1 and X2 to generate first directional microphone signal d1 with a bidirectional polar pattern. Adaptive channel decoupling unit 140 receives first calibration signal X1 and first directional microphone signal d1 to generate first main channel signal m1 and first reference channel signal r1 for noise detection. In another embodiment of the invention, adaptive channel decoupling unit 140 receives the sum of the first calibration signal X1 and the second calibration signal X2 and receives first directional microphone signal d1 to generate first main channel signal m1 and first reference channel signal r1 for noise detection.

Figure 2:
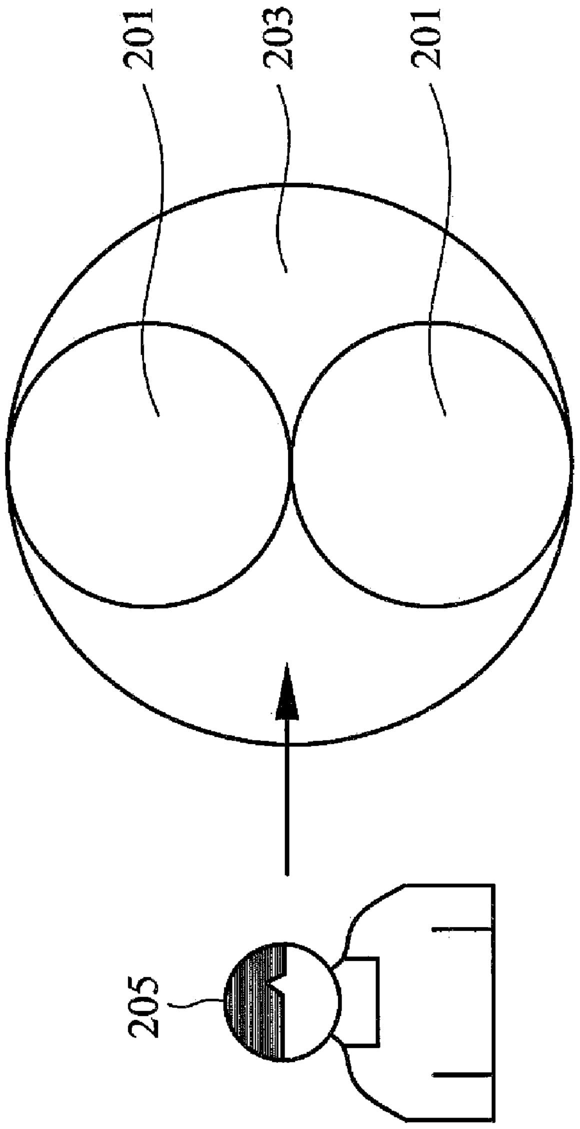
FIG. 2 is a schematic diagram of a bidirectional polar pattern and an omni-directional polar pattern according to an embodiment of the invention.

FIG. 2 is a schematic diagram of bidirectional polar pattern 201 and omni-directional polar pattern 203 according to an embodiment of the invention. Bidirectional polar pattern 201 comprises two main lobes. One lobe points left and another lobe points right, one lobe points up and another lobe points down, or one lobe points right up and another lobe points left down. Desired talker 205 faces the null of bidirectional polar pattern 201, as shown in FIG. 2. According to an embodiment of the invention, first and second omni-directional microphones Mic1 and Mic2 form a directional microphone with bidirectional polar pattern 201 for noise detection, and one of first and second omni-directional microphones Mic1 and Mic2 is used as a main microphone.

Figure 3:
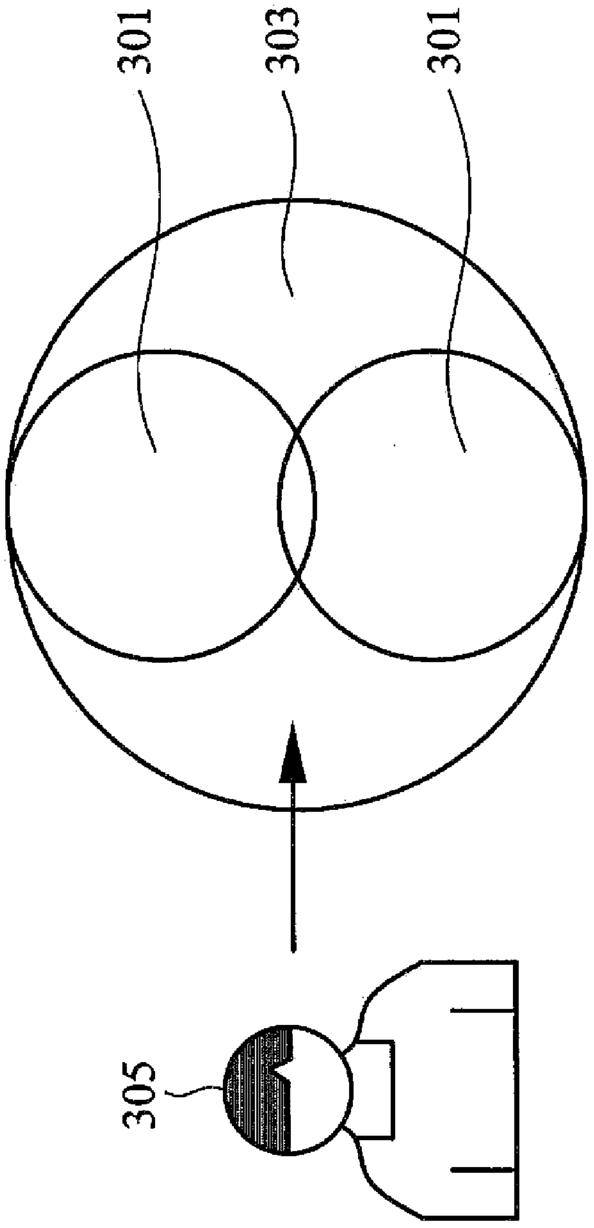
FIG. 3 is a schematic diagram of two single main lobe polar patterns and an omni-directional polar pattern according to an embodiment of the invention.

FIG. 3 is a schematic diagram of two single main lobe polar patterns 301 and 302 and omni-directional polar pattern 303 according to an embodiment of the invention. Two single main lobe polar patterns 301 and 302 can be formed by two omni-directional microphones. One lobe points left and another lobe points right, one lobe points up and another lobe points down, or one lobe points right up and another lobe points left down. Desired talker 205 faces the cross point or the equal gain point of two single lobes 301 and 302, as shown in FIG. 3.

Figure 4:
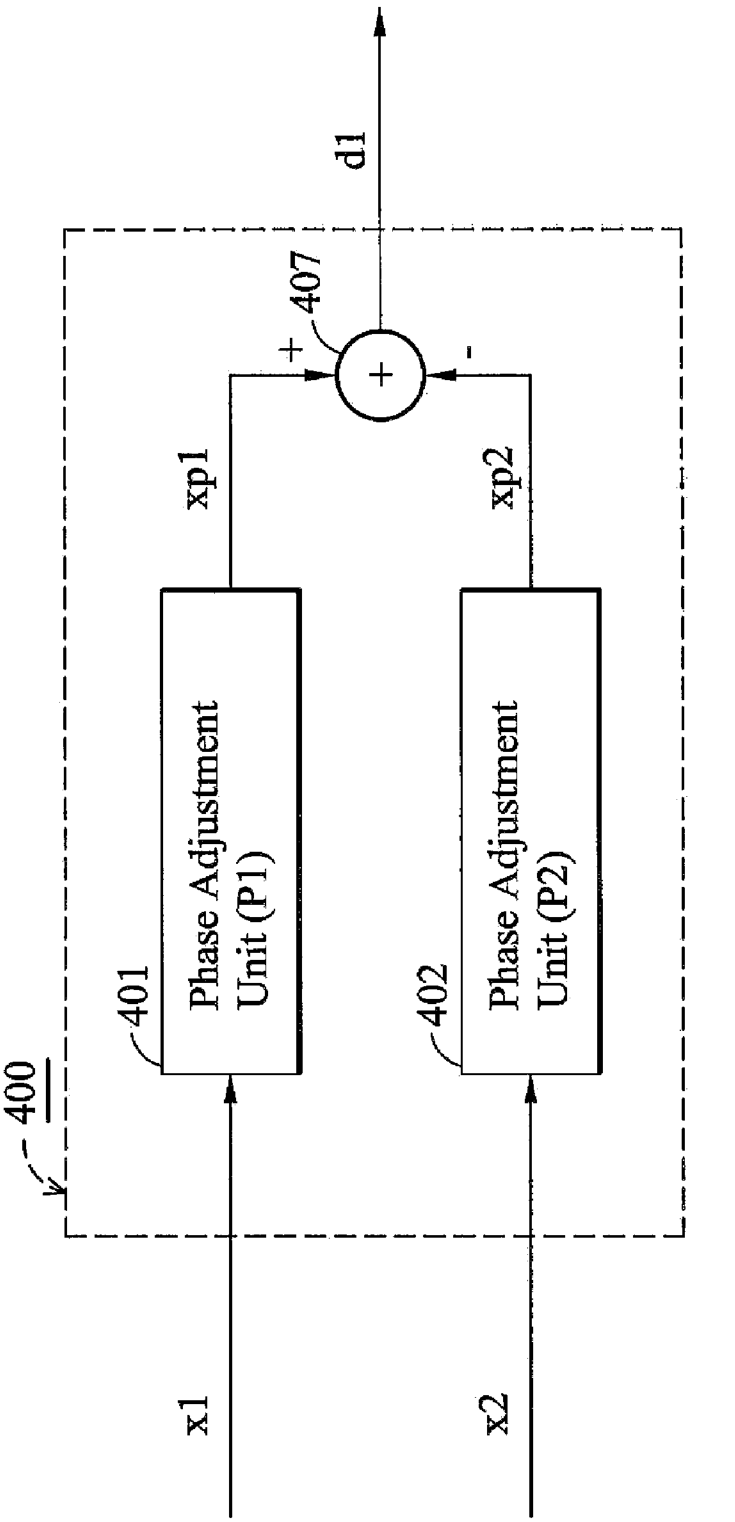
FIG. 4 is a schematic diagram of a directional microphone forming unit according to an embodiment of the invention.

FIG. 4 is a schematic diagram of directional microphone forming unit 120 according to an embodiment of the invention. Directional microphone forming unit 120 comprises phase adjustment units 401 and 402 and subtractor 407. Phase adjustment unit 401 shifts first calibration signal X1 phase P1 to generate first shifted signal XP1. Phase adjustment unit 402 shifts second calibration signal X2 phase P2 to generate second shifted signal XP2. Subtractor 407 subtracts second shifted signal XP2 from first shifted signal XP1 to generate first directional microphone signal d1 with a bidirectional polar pattern, as shown in FIG. 2. According to an embodiment of the invention, phase P1 is zero and Phase P2 is also zero. Thus, first directional microphone signal d1 is equal to second calibration signal X2 subtracted by first calibration signal X1 (d1=X1−X2). First microphone signal d1 is a signal with a bidirectional polar pattern.

Figure 5:
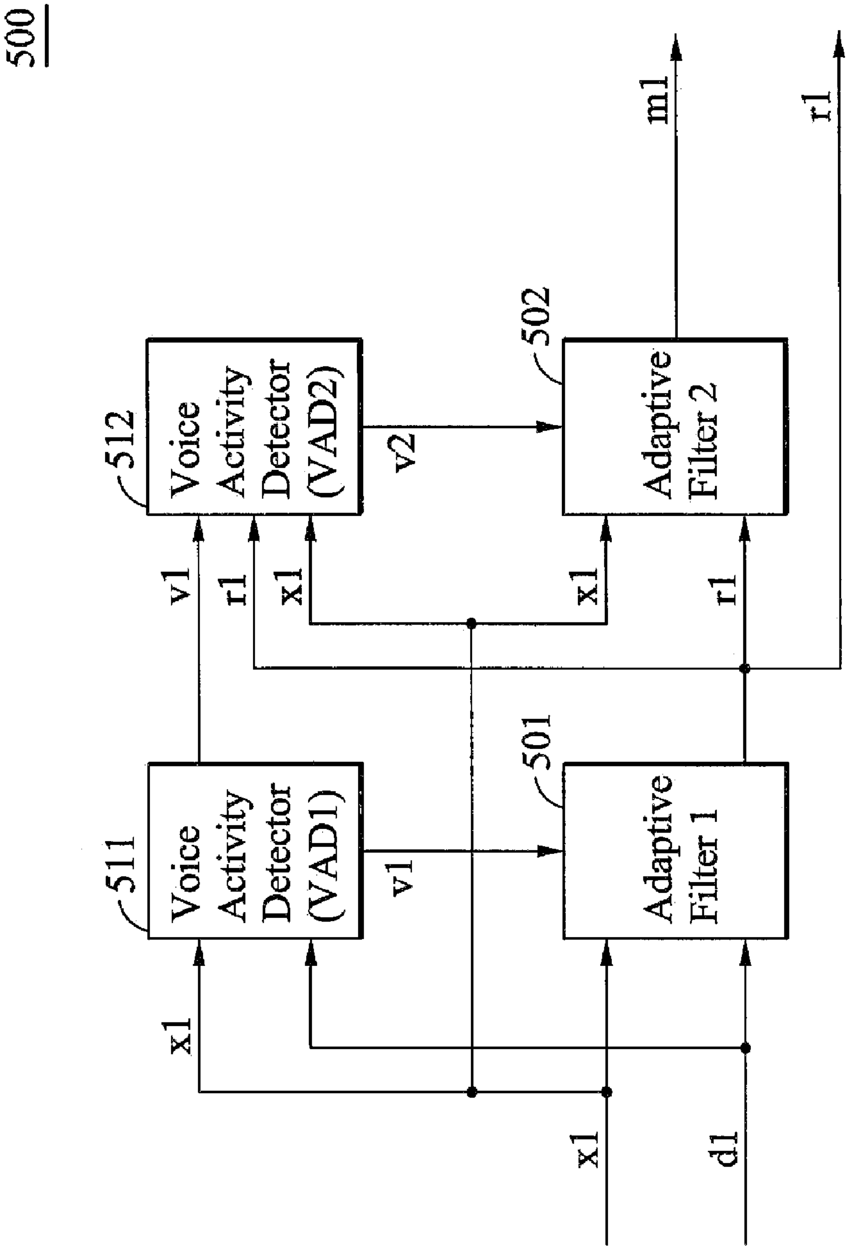
FIG. 5 is a schematic diagram of an adaptive channel decoupling unit according to another embodiment of the invention.

FIG. 5 is a schematic diagram of adaptive channel decoupling unit 500 according to another embodiment of the invention. Adaptive channel decoupling unit 500 comprises first voice activity detector (VAD1) 511, first adaptive filter 501, second voice activity detector (VAD2) 512 and second adaptive filter 502. First voice activity detector 511 receives first calibration signal X1 and first directional microphone signal d1 to generate first voice activity signal V1 for indicating the presence of desired voice. First adaptive filter 501 receives first calibration signal X1, first directional microphone signal d1 and first voice activity signal V1 and suppresses the desired voice of first directional microphone signal d1 to generate first reference channel signal r1. Second voice activity detector 512 receives first voice activity signal V1, first reference channel signal r1 and first calibration signal X1 to generate second voice activity signal V2 for indicating the presence of noise or interference. Second adaptive filter 502 receives second voice activity signal V2, first calibration signal X1, and first reference channel signal r1 and suppresses noise of first calibration signal X1 to generate first main channel signal m1.

Figure 6:
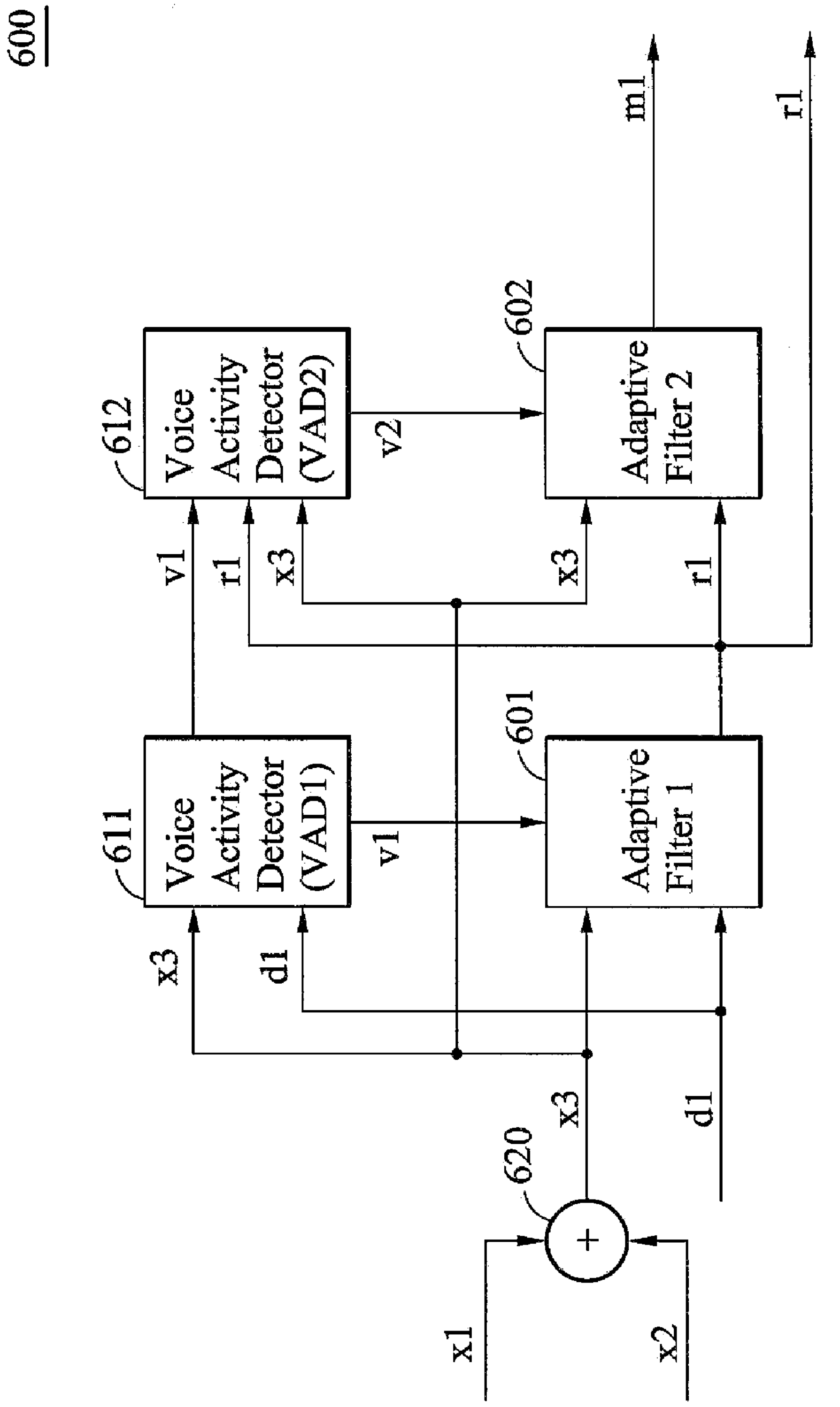
FIG. 6 is a schematic diagram of an adaptive channel decoupling unit according to another embodiment of the invention.

FIG. 6 is a schematic diagram of adaptive channel decoupling unit 600 according to another embodiment of the invention. The difference between adaptive channel decoupling units 600 and 500 is the presence of adder 620. Adaptive channel decoupling unit 600 comprises adder 620, first voice activity detector (VAD1) 611, first adaptive filter 601, second voice activity detector (VAD2) 612 and second adaptive filter 602. Adder adds first calibration signal X1 and second calibration signal X2 to output third calibration signal X3. First voice activity detector 611 receives third calibration signal X3 and first directional microphone signal d1 to generate first voice activity signal V1 for indicating the presence of desired voice. First adaptive filter 601 receives third calibration signal X3, first directional microphone signal d1, and first voice activity signal V1 and suppresses the desired voice of first directional microphone signal d1 to generate first reference channel signal r1. Second voice activity detector 612 receives first voice activity signal V1, first reference channel signal r1 and third calibration signal X3 to generate second voice activity signal V2 for indicating the presence of noise or interference. Second adaptive filter 602 receives second voice activity signal V2, third calibration signal X3 and first reference channel signal r1 and suppresses noise of third calibration signal X3 to generate first main channel signal m1.

Figure 7:
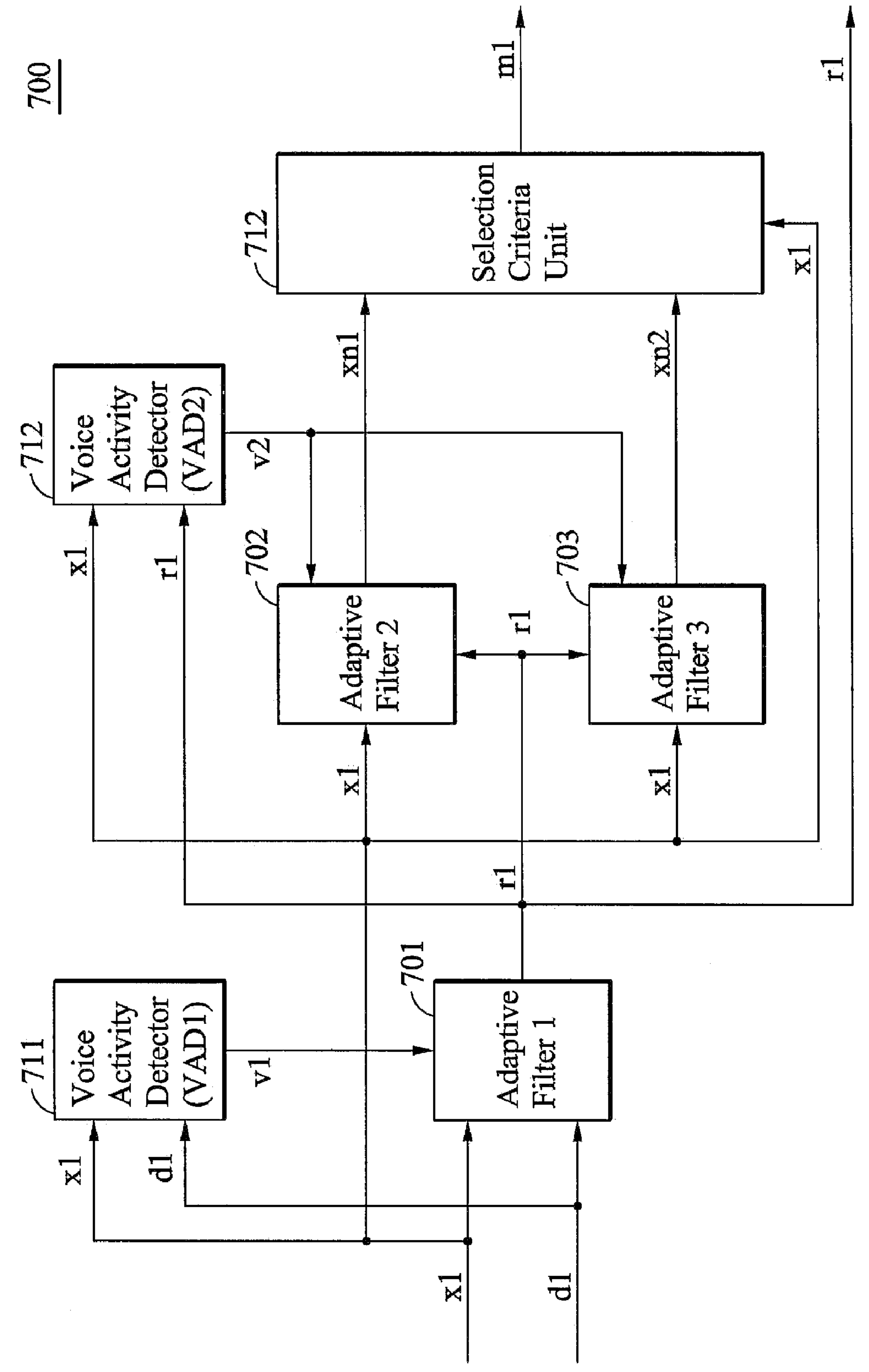
FIG. 7 is a schematic diagram of an adaptive channel decoupling unit according to another embodiment of the invention.

FIG. 7 is a schematic diagram of adaptive channel decoupling unit 700 according to another embodiment of the invention. Adaptive channel decoupling unit 700 comprises first voice activity detector (VAD1) 711, first adaptive filter 701, second voice activity detector (VAD2) 702, second adaptive filter 702, third adaptive filter 703 and selection criteria unit 721. First voice activity detector 711 receives first calibration signal X1 and first directional microphone signal d1 to generate first voice activity signal for indicating the presence of desired voice. First adaptive filter 701 receives first calibration signal X1, first directional microphone signal d1 and first voice activity signal V1 and suppresses the desired voice of first directional microphone signal d1 to generate first reference channel signal r1. Second voice activity detector 712 receives first reference signal r1 and first calibration signal X1 to generate second voice activity signal V2 for indicating the presence of noise or interference. Second adaptive filter 702 receives second voice activity signal V2, first calibration signal X1 and first reference channel signal r1 and suppresses one side (right side, one lobe of bidirectional polar pattern) noise of first calibration signal X1 to generate first adaptive filter signal Xn1. Third adaptive filter 703 receives second voice activity signal V2, first calibration signal X1 and first reference channel signal r1 and suppresses another side (left side, another lobe of bidirectional polar pattern) noise of first calibration signal X1 to generate second adaptive filter signal Xn2. Selection criteria unit 721 does a selection from first adaptive filter signal Xn1 and second adaptive filter signal Xn2 to output first main channel signal m1 according to first calibration signal X1. For example, m1=a*Xn1+b*Xn2.

Referring to FIG. 1, a transformer, such as Fast Fourier Transformer, 150 transforms first main channel signal m1 and first reference channel signal from time domain to frequency domain to correspondingly output first main signal m1 and first reference signal R1. First noise suppression unit 160 comprises noise estimating unit 162 and noise suppression unit 164. Noise estimating unit 162 generate ambient noise signal N1 by estimating noise of first reference signal R1. Noise suppression unit receives ambient noise signal N1, suppresses low frequency internal noise caused by forming the bidirectional microphone and generates first ambient noise signal N1'. Second noise suppression unit 170 comprises entire estimating unit 172, frequency domain voice activity detector 171 and noise suppression unit 174. Entire noise estimating unit 172 generates entire ambient noise signal N2 by estimating entire noise from first main signal M1 and first ambient noise signal N1'. Frequency domain voice activity detector 171 receives first main signal M1 and entire ambient noise signal N2 to generate third voice activity signal V3 for indicating noise. Noise suppression unit 174 receives entire ambient noise signal N2, first main signal M1 and third voice activity signal V3 to generate first clean voice signal M0 with ambient noise suppression. Inverse transformer, such as Inverse Fast Fourier Transformer, 180 transforms first main signal from frequency domain to time domain to generate second clear voice signal m0.

Figure 8:
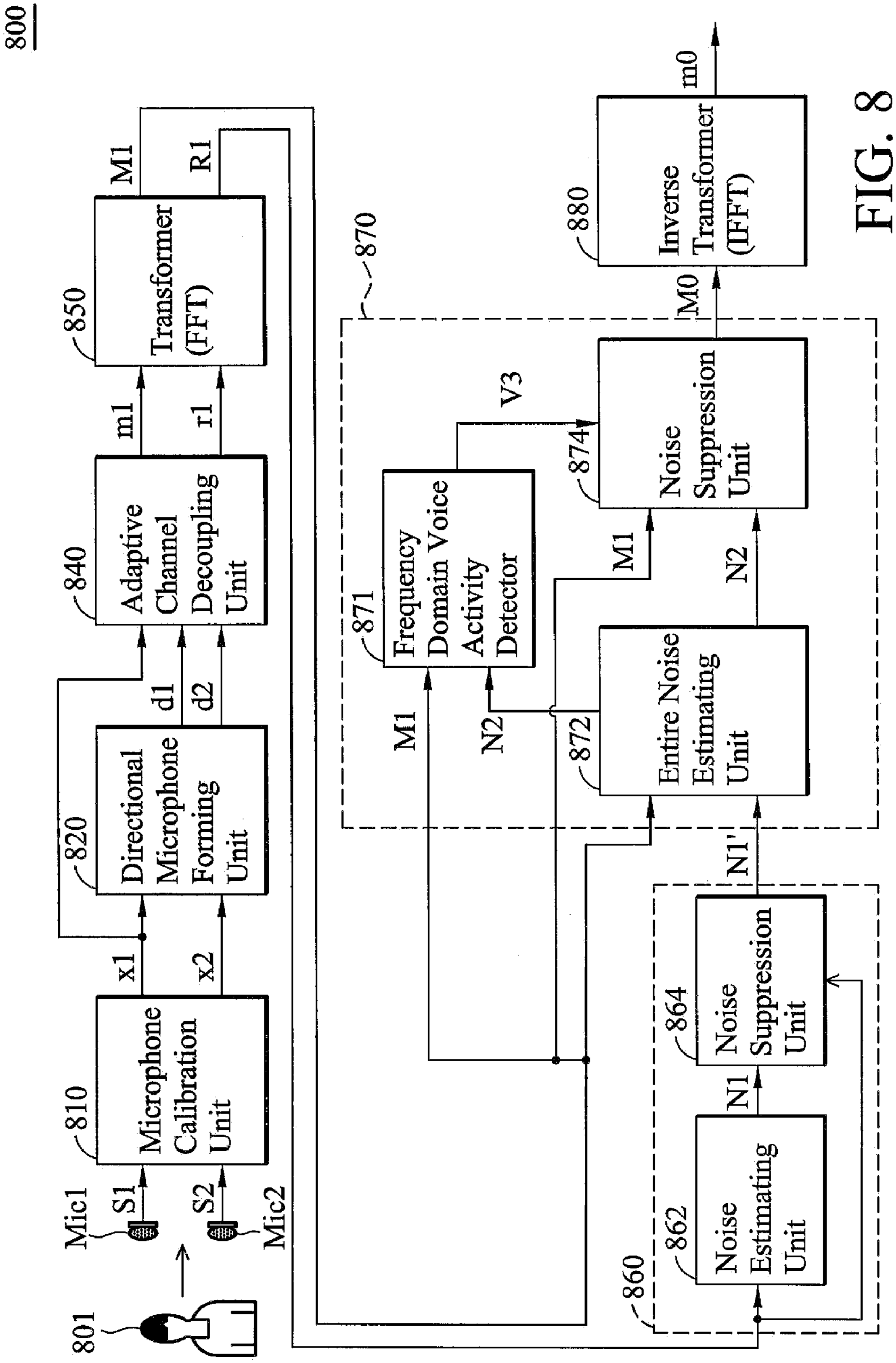
FIG. 8 is a schematic diagram of a broadside small array microphone beamforming apparatus according to another embodiment of the invention.

FIG. 8 is a schematic diagram of broadside small array microphone beamforming apparatus 800 according to another embodiment of the invention. Broadside small array microphone beamforming apparatus 800 comprises omni-directional microphones Mic11 and Mic12, microphone calibration unit 810, directional microphone forming unit 820, adaptive channel decoupling unit 840, transformer 850, noise suppression units 860 and 870 and inverse transformer 880. Omni-directional microphones Mic3 and Mic2 respectively convert voice from desired near-end talker 801 into first and second signals S1 and S2. Second and first omni-directional microphones Mic12 and Mic11 and desired near-end talker 801 are respectively arranged at three points of a triangle, referred to as a broadside way, as shown in FIG. 8. Microphone calibration unit 810 receives first and second signals S1 and S2 and correspondingly outputs first and second calibration signals X1 and X2. Directional microphone forming unit 120 receives first and second calibration signals X1 and X2 to generate first directional microphone signal d1 with one side polar pattern and second directional microphone signal d2 with another side lobe polar pattern, as shown in FIG. 3. Adaptive channel decoupling unit 840 receives first calibration signal X1, first directional microphone signal d1 and second directional microphone signal d2 to generate first main channel signal m1 and first reference channel signal r1 for noise detection. In another embodiment of the invention, adaptive channel decoupling unit 840 receives the sum of the first calibration signal X1 and the second calibration signal X2 and receives first directional microphone signal d1 and second directional microphone signal d2 to generate first main channel signal m1 and first reference channel signal r1 for noise detection.

As shown in FIG. 8, first and second omni-directional microphones Mic11 and Mic12 form two directional microphones with single lobe polar patterns for noise detection, and one of the first and second omni-directional microphones is used as a main microphone. Desired near-end talker 801 faces a cross point or a point of equal gains of two single polar pattern.

Figure 9:
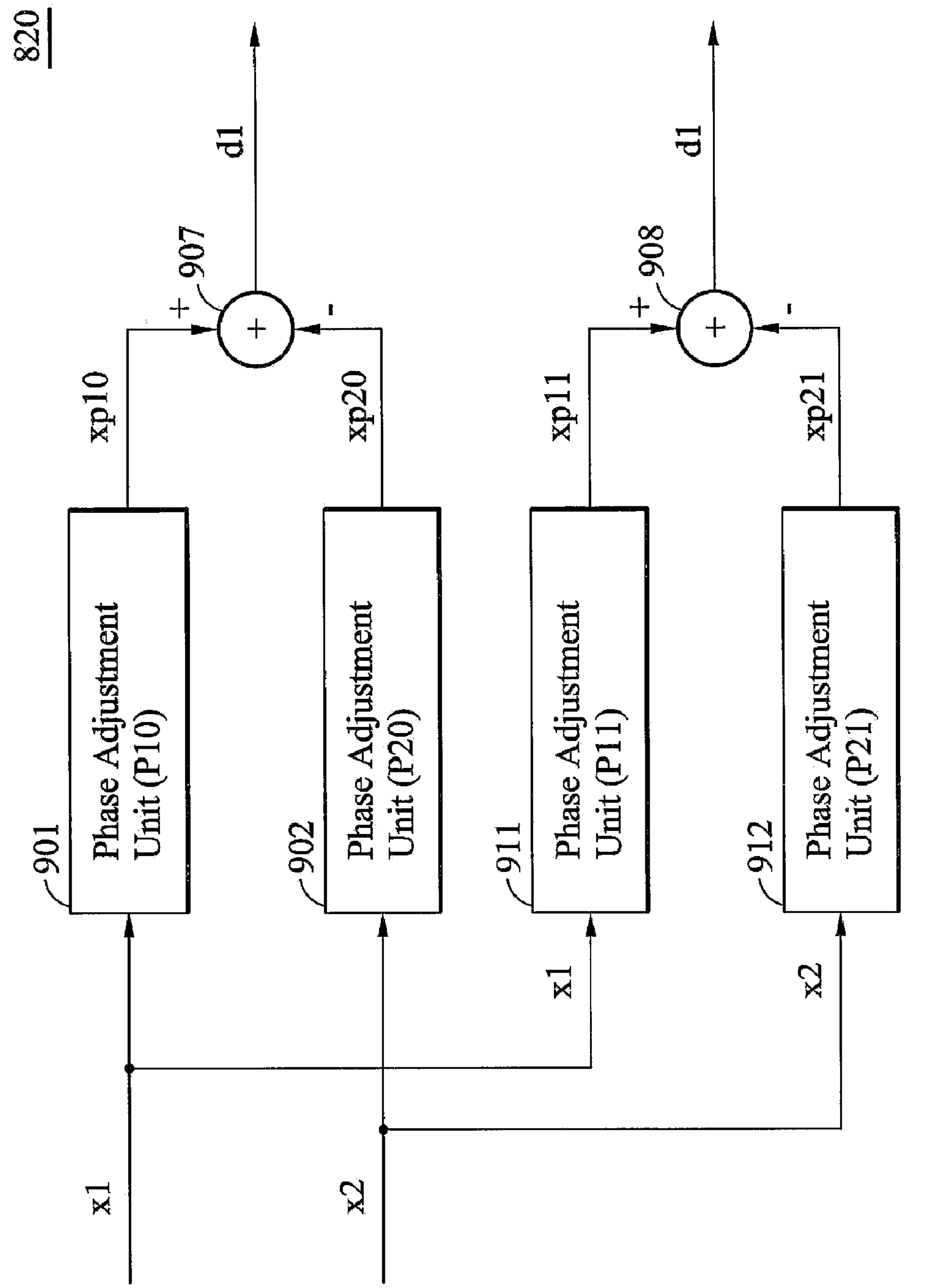
FIG. 9 is a schematic diagram of a directional microphone forming unit according to another embodiment of the invention.

FIG. 9 is a schematic diagram of directional microphone forming unit 820 according to another embodiment of the invention. Directional microphone forming unit 820 comprises phase adjustment units 901, 902, 903 and 904 and subtractors 907 and 908. Phase adjustment unit 901 shifts first calibration signal X1 phase P10 to generate first shifted signal XP10. Phase adjustment unit 902 shifts second calibration signal X2 phase P20 to generate second shifted signal XP20. Phase adjustment unit 911 shifts first calibration signal X1 phase P11 to generate third shifted signal XP 11. Phase adjustment unit 912 shifts second calibration signal X2 phase P21 to generate fourth shifted signal XP21. Subtractor 907 subtracts second shifted signal XP20 from first shifted signal XP10 to generate first directional microphone signal d1 with one side single polar pattern 301, as shown in FIG. 3. Subtractor 908 subtracts fourth shifted signal XP21 from third shifted signal XP11 to generate second directional microphone signal d2 with another side single polar pattern 302, as shown in FIG. 3.

According to an embodiment of the invention, phases P10 and P21 are zero and Phases P20 and P11 are T (the delay for sound propagation between two microphones). Thus, omni-directional microphones Mic11 and Mic12 can form a first directional microphone with a single lobe polar pattern and second directional microphone with another single lobe polar pattern.

Figure 10:
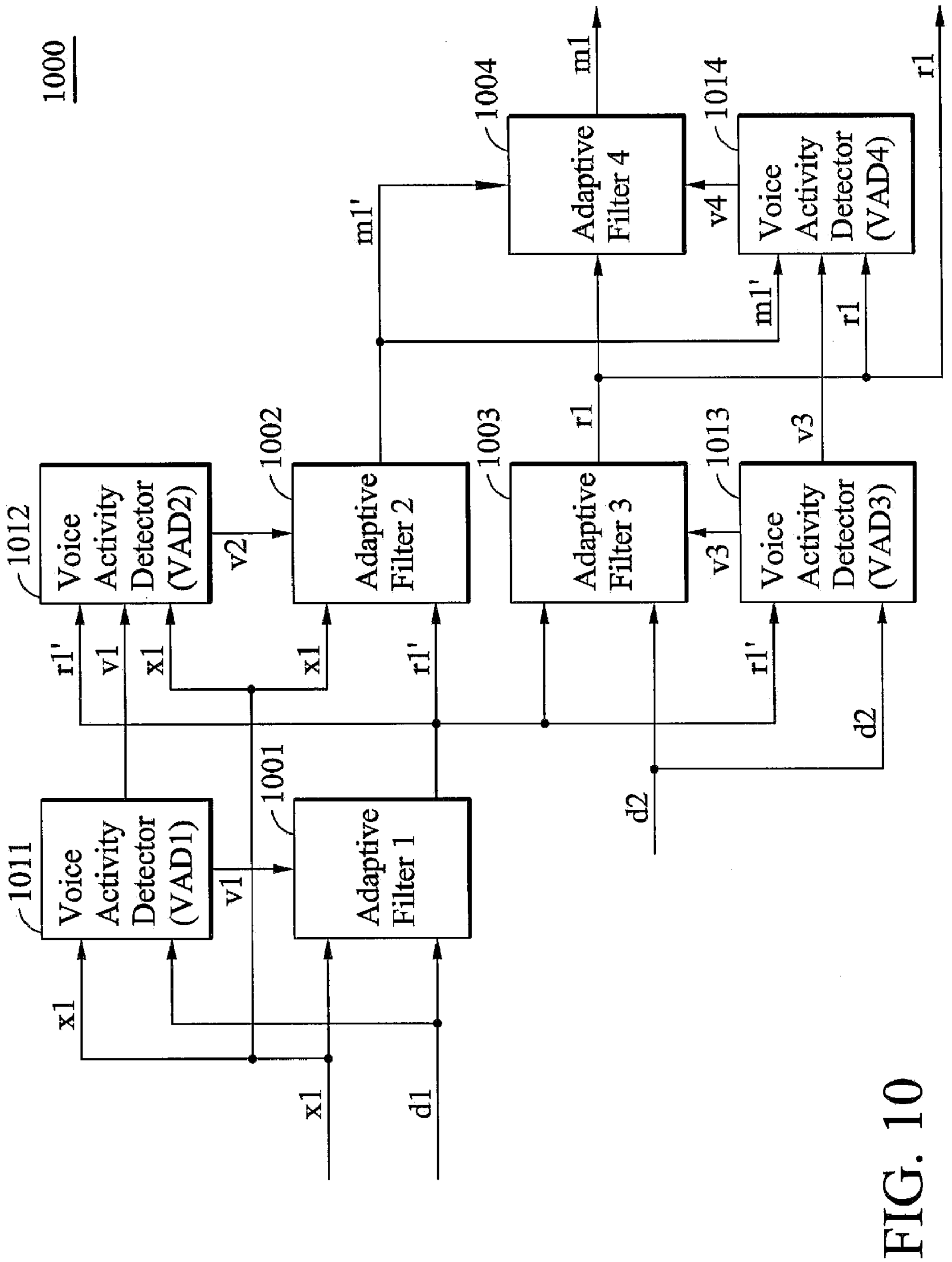
FIG. 10 is a schematic diagram of an adaptive channel decoupling unit according to another embodiment of the invention.

FIG. 10 is a schematic diagram of adaptive channel decoupling unit 1000 according to another embodiment of the invention. Adaptive channel decoupling unit 1000 comprises voice activity detectors 1011, 1012, 1013 and 1014 and adaptive filter 1001, 1002, 1003 and 1004. First Voice activity detector (VAD1) 1011 receives first calibration X1 and first directional microphone signal d1 to generate first voice activity signal V1 for indicating desired voice. First adaptive filter 1001 receives first calibration signal X1, first directional microphone signal d1 and first voice activity signal V1, and suppresses the desired voice of first directional microphone signal d1 to generate reference channel signal r1'. Second voice activity detector (VAD2) 1012 receives first voice activity signal V1, reference channel signal r1' and first calibration signal X1 to generate second voice activity signal V2 for indicating noise or interference. Second adaptive filter 1002 receives second voice activity signal V2, first calibration signal X1 and reference channel signal r1' and suppresses noise of first calibration signal X1 to generate main channel signal m1'. Third voice activity detector (VAD3) 1013 receives reference channel signal r1' and second directional microphone signal d2 to generate third voice activity signal V3 for indicating the desired voice. Third adaptive filter 1003 receives reference channel signal r1', second directional microphone signal d2 and third voice activity signal V3, and suppresses the desired voice of second directional microphone d2 to generate first reference channel signal r1. Fourth voice activity detector (VAD4) 1014 receives third voice activity signal V3, first reference channel signal r1 and main channel signal m1' to generate fourth voice activity signal V4 for indicating noise of interference. Fourth adaptive filter 1004 receives fourth voice activity signal V4, main channel signal m1', first reference channel signal r1 and suppresses noise of main channel signal m1' to generate first main channel signal m1.

Figure 11:
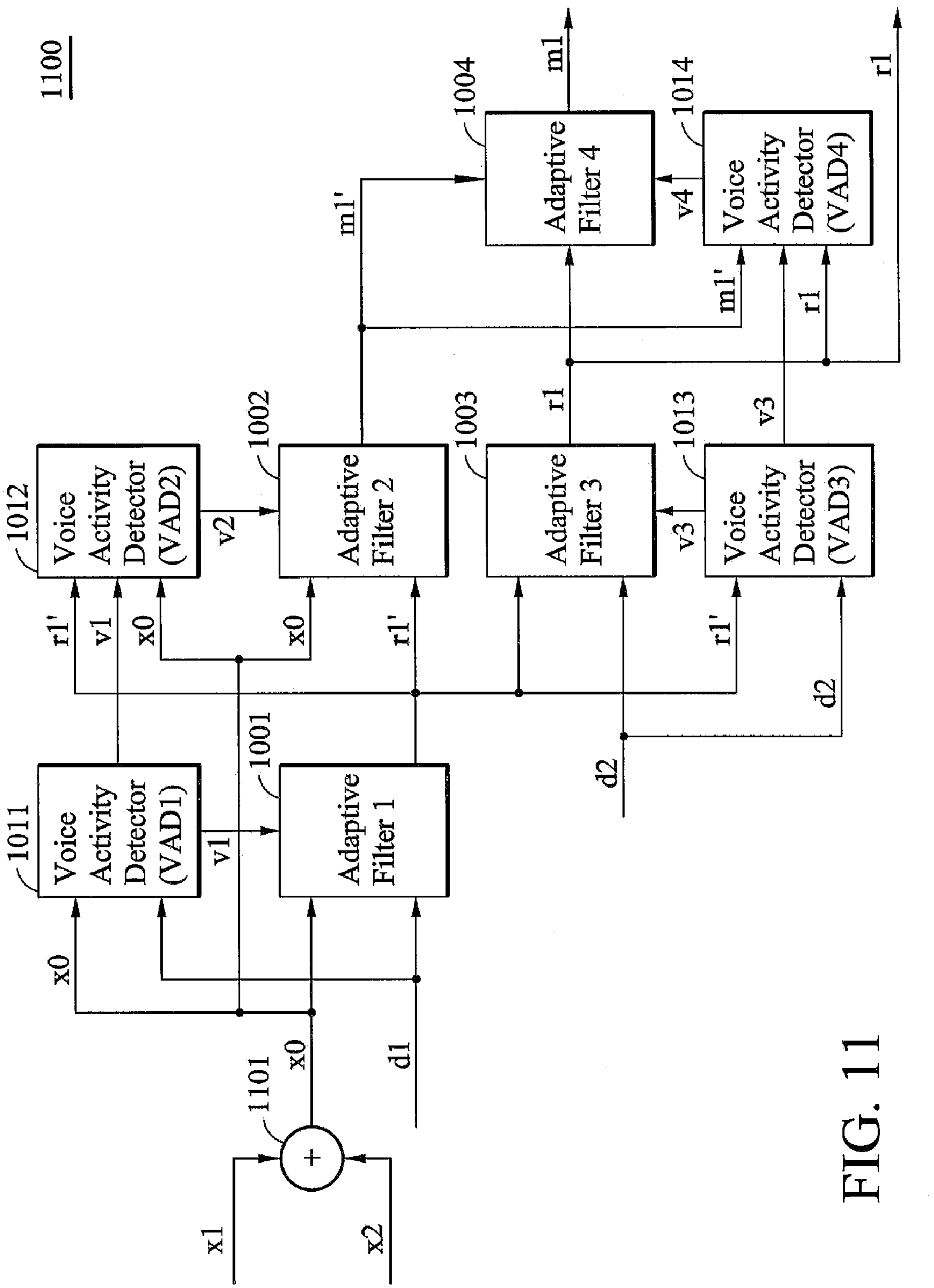
FIG. 11 is a schematic diagram of an adaptive channel decoupling unit according to another embodiment of the invention.

FIG. 11 is a schematic diagram of adaptive channel decoupling unit 1100 according to another embodiment of the invention. The difference between adaptive channel decoupling units 1000 and 1100 is adder 1101. Adder 1101 adds first calibration signal X1 and second calibration signal X2 to output calibration signal X0. Since the operation of adaptive channel decoupling unit 1100 in FIG. 11 is similar to the operation of adaptive channel decoupling unit 1000 in FIG. 10, it is not detailed here.

Referring to FIG. 1, first noise suppression unit 860 comprises noise estimating unit 862 and noise suppression unit 864 and second noise suppression unit 870 comprises entire estimating unit 872, frequency domain voice activity detector 871 and noise suppression unit 874. The operation of transformer 850, noise suppression units 860 and 870 and inverse transformer 880 is the same as that of transformer 150, noise suppression units 160 and 170 and inverse transformer 180. Thus, it is not detailed here.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A broadside small array microphone beamforming apparatus, comprising:

first and second omni-directional microphones respectively converting voice from a desired near-end talker into first and second signals with a first omni-directional polar pattern and a second omni-directional polar pattern respectively;

a microphone calibration unit receiving the first and second signals and correspondingly outputting first and second calibration signals for adjusting phase of the first and second signals output by the first and second omni-directional microphones; and a directional microphone forming unit receiving the first and second calibration signals to generate a directional microphone signal with a bi-directional polar pattern according to the first and second calibration signals; and an adaptive channel decoupling unit receiving one of the first calibration signal or the second calibration signal in addition to the sum of the first calibration signal and the second calibration signal, wherein the adaptive channel decoupling unit further receives the directional microphone signal to generate a first main channel signal and a first reference channel signal for noise detection.

2. The broadside small array microphone beamforming apparatus as claimed in claim 1, wherein the at least one direction microphone signal with a polar pattern is a directional microphone signal with a bidirectional polar pattern.

3. The broadside small array microphone beamforming apparatus as claimed in claim 2, wherein the first and second omni-directional microphones form a directional microphone with the bidirectional polar pattern for noise detection, and one of the first and second omni-directional microphones is used as a main microphone.

4. The broadside small array microphone beamforming apparatus as claimed in claim 2, wherein the second and first omni-directional microphones and the desired near-end talker are respectively arranged at three points of a triangle.

5. The broadside small array microphone beamforming apparatus as claimed in claim 2, wherein the desired near-end talker faces the null of the bidirectional polar pattern.

6. The broadside small array microphone beamforming apparatus as claimed in claim 2, wherein the direction microphone forming unit comprises:

a first phase adjustment unit shifting the first calibration signal a first phase to generate a first shifted signal;

a second phase adjustment unit shifting the second calibration signal a second phase to generate a second shifted signal; and a first subtractor subtracting the second shifted signal from the first shifted signal to generate the directional microphone signal.

7. The broadside small array microphone beamforming apparatus as claimed in claim 2, wherein the adaptive channel decoupling unit comprises:

a first voice activity detector receiving the first calibration signal and the directional microphone signal to generate a first voice activity signal for indicating desired voice;

a first adaptive filter receiving the first calibration signal, the directional microphone signal and the first voice activity signal, and suppressing the desired voice of the directional microphone signal to generate the first reference channel signal;

a second voice activity detector receiving the first voice activity signal, the first reference channel signal and the first calibration signal to generate a second voice activity signal for indicating noise; and a second adaptive filter receiving the second voice activity signal, the first calibration signal and the first reference channel signal, and suppressing noise of the first calibration signal to generate the first main channel signal.

8. The broadside small array microphone beamforming apparatus as claimed in claim 2, wherein the adaptive channel decoupling unit comprises:

a first adder adding the first calibration signal and the second calibration signal to generate a third calibration signal;

a first voice activity detector receiving the third calibration signal and the directional microphone signal to generate a first voice activity signal for indicating desired voice;

a first adaptive filter receiving the third calibration signal, the directional microphone signal and the first voice activity signal, and suppressing the desired voice of the directional microphone signal to generate the first reference channel signal;

a second voice activity detector receiving the first voice activity signal, the first reference channel signal and the third calibration signal to generate a second voice activity signal for indicating noise; and a second adaptive filter receiving the second voice activity signal, the third calibration signal and the first reference channel signal, and suppressing noise of the third calibration signal to generate the first main channel signal.

9. The broadside small array microphone beamforming apparatus as claimed in claim 2, wherein the adaptive channel decoupling unit comprises:

a first voice activity detector receiving the first calibration signal and the directional microphone signal to generate a first voice activity signal for indicating desired voice;

a first adaptive filter receiving the first calibration signal, the directional microphone signal and the first voice activity signal, and suppressing the desired voice of the directional microphone signal to generate the first reference channel signal;

a second voice activity detector receiving the first reference channel signal and the first calibration signal to generate a second voice activity signal for indicating noise;

a second adaptive filter receiving the second voice activity signal, the first calibration signal and the first reference channel signal, and suppressing one side noise of the first calibration signal to generate a first adaptive filter signal;

a third adaptive filter receiving the second voice activity signal, the first calibration signal and the first reference channel signal, and suppressing another side noise of the first calibration signal to generate a second adaptive filter signal; and a selection criteria unit selecting from first adaptive filter signal and the second adaptive filter signal to output the first main channel signal according to the first calibration signal.

10. The broadside small array microphone beamforming apparatus as claimed in claim 2, further comprising:

a transformer transforming the first main channel signal and the first reference channel signal from time domain to frequency domain to correspondingly output a first main signal and a first reference signal;

a first noise suppression unit receiving the first reference signal to estimate ambient noise, suppressing low frequency internal noise and generating a first ambient noise signal;

a second noise suppression unit receiving the first main signal and the first ambient noise signal, suppressing entire noise and generating a first clean voice signal;

an inverse transformer transforming the first clean voice signal from frequency domain to time domain to generate a second clear voice signal.

11. The broadside small array microphone beamforming apparatus as claimed in claim 2, wherein the first noise suppression unit comprises:

a noise estimating unit generating an ambient noise signal by estimating noise of the first reference signal; and a noise suppression unit receiving the ambient noise signal and first reference signal, suppressing the low frequency internal noise and generating the first ambient noise signal.

12. The broadside small array microphone beamforming apparatus as claimed in claim 1, wherein the second noise suppression unit comprises:

an entire noise estimating unit generating an entire ambient noise signal by estimating entire noise from the first main signal and the first ambient noise signal;

a frequency domain voice activity detector receiving the first main signal and the entire ambient noise signal to generate a third voice activity signal for indicating noise; and a noise suppression unit receiving the entire ambient noise signal, the first main signal and the third voice activity signal to generate the first clean voice signal with ambient noise suppression.

13. The broadside small array microphone beamforming apparatus as claimed in claim 2, wherein the at least one direction microphone signal with a polar pattern comprises a first directional microphone signal with one side lobe polar pattern and a second directional microphone signal with another side lobe polar pattern.

14. The broadside small array microphone beamforming apparatus as claimed in claim 13, wherein the first and second omni-directional microphones form two directional microphones with single lobe polar patterns for noise detection, and one of the first and second omni-directional microphones is used as a main microphone.

15. The broadside small array microphone beamforming apparatus as claimed in claim 13, wherein the second and first omni-directional microphones and the desired near-end talker are respectively arranged at three points of a triangle.

16. The broadside small array microphone beamforming apparatus as claimed in claim 13, wherein the desired near-end talker faces a cross point or a point of equal gains of two single polar patterns.

17. The broadside small array microphone beamforming apparatus as claimed in claim 13, wherein the direction microphone forming unit comprises:

a first phase adjustment unit shifting the first calibration signal a first phase to generate a first shifted signal;

a second phase adjustment unit shifting the second calibration signal a second phase to generate a second shifted signal;

a third phase adjustment unit shifting the first calibration signal a third phase to generate a third shifted signal;

a fourth phase adjustment unit shifting the second calibration signal a fourth phase to generate a fourth shifted signal;

a first subtractor subtracting the second shifted signal from the first shifted signal to generate the first directional microphone signal; and a second subtractor subtracting the fourth shifted signal from the third shifted signal to generate the second directional microphone signal.

18. The broadside small array microphone beamforming apparatus as claimed in claim 13, wherein the adaptive channel decoupling unit comprises:

a first voice activity detector receiving the first calibration signal and the first directional microphone signal to generate a first voice activity signal for indicating desired voice;

a first adaptive filter receiving the first calibration signal, the first directional microphone signal and the first voice activity signal, and suppressing desired voice of the first directional microphone signal to generate a reference channel signal;

a second voice activity detector receiving the first voice activity signal, the reference channel signal and the first calibration signal to generate a second voice activity signal for indicating noise;

a second adaptive filter receiving the second voice activity signal, the first calibration signal and the reference channel signal, and suppressing noise of the first calibration signal to generate a main channel signal;

a third voice activity detector receiving the reference channel signal and the second directional microphone signal to generate a third voice activity signal for indicating desired voice;

a third adaptive filter receiving the reference channel signal, the second directional microphone signal and the third voice activity signal, and suppressing desired voice of the second directional microphone signal to generate the first reference channel signal;

a fourth voice activity detector receiving the third voice activity signal, the first reference channel signal and the main channel signal to generate a fourth voice activity signal for indicating noise; and a fourth adaptive filter receiving the fourth voice activity signal, the main channel signal and the first reference channel signal, and suppressing noise of the main channel signal to generate the first main channel signal.

19. The broadside small array microphone beamforming apparatus as claimed in claim 13, wherein the adaptive channel decoupling unit comprises:

an adder adding the first calibration signal and the second calibration to output a calibration signal;

a first voice activity detector receiving the calibration signal and the first directional microphone signal to generate a first voice activity signal for indicating desired voice;

a first adaptive filter receiving the calibration signal, the first directional microphone signal and the first voice activity signal, and suppressing desired voice of the first directional microphone signal to generate a reference channel signal;

a second voice activity detector receiving the first voice activity signal, the reference channel signal and the calibration signal to generate a second voice activity signal for indicating noise;

a second adaptive filter receiving the second voice activity signal, the calibration signal and the reference channel signal, and suppressing noise of the first calibration signal to generate a main channel signal;

a third voice activity detector receiving the reference channel signal and the second directional microphone signal to generate a third voice activity signal for indicating desired voice;

a third adaptive filter receiving the reference channel signal, the second directional microphone signal and the third voice activity signal, and suppressing desired voice of the second directional microphone signal to generate the first reference channel signal;

a fourth voice activity detector receiving the third voice activity signal, the first reference channel signal and the main channel signal to generate a fourth voice activity signal for indicating noise; and a fourth adaptive filter receiving the fourth voice activity signal, the main channel signal and the first reference channel signal, and suppressing noise of the main channel signal to generate the first main channel signal.

20. The broadside small array microphone beamforming apparatus as claimed in claim 13, further comprising:

a transformer transforming the first main channel signal and the first reference channel signal from time domain to frequency domain to correspondingly output a first main signal and a first reference signal;

a first noise suppression unit receiving the first reference signal to estimate ambient noise, suppressing low frequency internal noise and generating a first ambient noise signal;

a second noise suppression unit receiving the first main signal and the first ambient noise signal, suppressing entire noise and generating a first clean voice signal;

an inverse transformer transforming the first clean voice signal from frequency domain to time domain to generate a second clear voice signal.

21. The broadside small array microphone beamforming apparatus as claimed in claim 13, wherein the second noise suppression unit comprises:

a noise estimating unit receiving the first reference signal to generate an ambient noise signal; and a noise suppression unit receiving the ambient noise signal, suppressing low frequency internal noise and generating the first ambient noise signal.

22. The broadside small array microphone beamforming apparatus as claimed in claim 13, wherein the second noise suppression unit comprises:

an entire noise estimating unit receiving the first main signal and the first ambient noise signal to generate an entire ambient noise signal;

a frequency domain voice activity detector receiving the first main signal and the entire ambient noise signal to generate a third voice activity signal; and a noise suppression unit receiving the entire ambient noise signal, the first main signal and the third voice activity signal to generate the first clean voice signal.

* * * * *